(12) United States Patent
Lienkamp et al.

(10) Patent No.: US 7,682,719 B2
(45) Date of Patent: Mar. 23, 2010

(54) METHOD FOR ADAPTIVE PREDICTION OF STACK VOLTAGE IN AUTOMOTIVE FUEL CELL SYSTEMS

(75) Inventors: Sebastian Lienkamp, Budenheim (DE); Bernd Krause, Liederbach (DE)

(73) Assignee: GM Global Technology Operations, Inc., Detroit, MI (US)

( * ) Notice: Subject to any disclaimer, the term of this patent is extended or adjusted under 35 U.S.C. 154(b) by 348 days.

(21) Appl. No.: 11/534,341

(22) Filed: Sep. 22, 2006

(65) Prior Publication Data

US 2008/0076012 A1 Mar. 27, 2008

(51) Int. Cl.
*H01M 8/04* (2006.01)
*H01M 8/12* (2006.01)
(52) U.S. Cl. .............................. 429/23; 429/22; 429/24
(58) Field of Classification Search .................. 429/22, 429/23
See application file for complete search history.

(56) References Cited

U.S. PATENT DOCUMENTS

| 6,692,581 | B2 | 2/2004 | Tong et al. |
| 6,847,188 | B2 | 1/2005 | Keskula et al. |
| 2002/0051899 | A1* | 5/2002 | Keskula et al. ................. 429/17 |

\* cited by examiner

*Primary Examiner*—Dah-Wei D Yuan
*Assistant Examiner*—Stephan Essex
(74) *Attorney, Agent, or Firm*—John A. Miller; Miller IP Group, PLC

(57) ABSTRACT

A method for revising a reference polarization curve of a fuel cell stack that identifies the relationship between the voltage and the current of the stack over time. When the stack is operating at a low load where kinetic voltage losses of the stack dominate, a first adaptation value is revised as the difference between the actual stack voltage and the stack voltage of the reference polarization curve. When the stack is operating at higher loads where ohmic voltage losses of the stack dominate, a second adaptation value is revised as the difference between the actual stack voltage and the stack voltage of the reference polarization curve.

23 Claims, 2 Drawing Sheets

METHOD FOR ADAPTIVE PREDICTION OF STACK VOLTAGE IN AUTOMOTIVE FUEL CELL SYSTEMS

BACKGROUND OF THE INVENTION

1. Field of the Invention

This invention relates generally to a method for revising the current/voltage relationship of a fuel cell stack over time and, more particularly, to a method for revising the current/voltage relationship of a fuel cell stack as it ages that includes changing a first adaptation value when the stack is operating in a kinetic region and changing a second adaptation value when the stack is operating in an ohmic region.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The dynamic power of a fuel cell system is limited. Further, the time delay from system start-up to driveability and low acceleration of the vehicle may not be acceptable. The voltage cycles can decrease the stack durability. These drawbacks can be minimized by using a high voltage battery in parallel with the fuel cell stack. Algorithms are employed to provide the distribution of power from the battery and the fuel cell stack to meet the requested power.

For the reasons discussed above, some fuel cell vehicles are hybrid vehicles that employ a rechargeable supplemental power source in addition to the fuel cell stack, such as a DC battery or a super capacitor (also referred to as an ultra-capacitor or double layer capacitor). The power source provides supplemental power for the various vehicle auxiliary loads, for system start-up and during high power demands when the fuel cell stack is unable to provide the desired power. More particularly, the fuel cell stack provides power to a traction motor and other vehicle systems through a DC voltage bus line for vehicle operation. The battery provides the supplemental power to the voltage bus line during those times when additional power is needed beyond what the stack can provide, such as during heavy acceleration. For example, the fuel cell stack may provide 70 kW of power. However, vehicle acceleration may require 100 kW or more of power. The fuel cell stack is used to recharge the battery at those times when the fuel cell stack is able to meet the system power demand. The generator power available from the traction motor during regenerative braking is also used to recharge the battery through the DC bus line.

FIG. 1 is a schematic block diagram of a hybrid fuel cell system 10 including a fuel cell stack 12 and a high voltage battery 14. The battery 14 is intended to represent any type of rechargeable energy storage system (RESS) suitable for the fuel cell application described herein. The fuel cell stack 12 provides electrical power to a high voltage bus line, represented here as positive bus line 16 and negative bus line 18. In a vehicle fuel cell system, the fuel cell stack 12 may include about 400 fuel cells. The battery 14 is also coupled to the high voltage bus lines 16 and 18, and provides supplemental power as discussed above. A power controller 20 controls the distribution of power provided by the stack 12 and the battery 14.

The fuel cell system 10 includes a power inverter module (PIM) 22 electrically coupled to the bus lines 16 and 18 and an AC or DC traction motor 24. The PIM 22 converts the DC voltage on the bus lines to an AC voltage suitable for the AC traction motor 24. The traction motor 24 provides the traction power to operate the vehicle, as is well understood in the art. The traction motor 24 can be any suitable motor for the purposes described herein, such as an AC induction motor, an AC permanent magnet motor and an AC three-phase synchronous machine. During regenerative braking when the traction motor 24 is operating as a generator, electrical AC power from the motor 24 is converted to DC power by the PIM 22, which is then applied to the bus lines 16 and 18 to recharge the battery 14. A blocking diode (not shown) prevents the regenerative electrical energy applied to the bus lines 16 and 18 from flowing into the fuel cell stack 12, which could otherwise damage the stack 12.

For a typical hybrid vehicle strategy, the battery 14 is mainly used to increase efficiency, lower the dynamic requirements of the fuel cell system, and/or increase the performance of the vehicle. If the vehicle operator demands more power, the battery 14 can provide the stored power to the traction motor 24 very fast. Additional demanded power can be quickly provided by the fuel cell system.

It is necessary to determine how much current can be drawn from the fuel cell stack 12 and the battery 14 as the load on the system 10 changes. To do this, the power controller 20 needs to know how the current draw will split between the fuel cell stack 12 and the battery 14 so that more current is not drawn from the stack 12 or the battery 14 than it is able to provide. The power controller 20 is able to predict the current split between the fuel cell stack 12 and the battery 14 if it can predict their electrical behavior. For example, if the stack 12 can provide 500 A and the battery 14 can provide 200 A, the controller 20 needs to limit the total current draw from both the stack 12 and the battery 14 consistent with their actual ability to provide the current. This may result in limiting the stack current to 400 A. A current split of one-third to two-thirds may be predicted by the power controller 20 in order to not exceed the battery capability.

In the system 10, the fuel cell stack 12 and the battery 14 are directly coupled to the high voltage bus lines 16 and 18. However, this is merely a representative example of a fuel cell system for a hybrid vehicle. Ultra-capacitors and DC/DC converters can also be employed to match the different voltage ranges of the fuel cell stack 12 and the battery 14, as would be well understood to those skilled in the art. For example, known fuel cell hybrid vehicles sometimes employ a bidirectional DC/DC converter to step up the DC voltage from the battery to match the battery voltage to the bus line voltage dictated by the stack voltage and step down the stack voltage during battery recharging. Various designs have been proposed in the art to eliminate the DC/DC converter because it is large, costly and heavy.

The controller 20 needs to know the current/voltage relationship, referred to as a polarization curve, of the fuel cell stack 12 and the battery 14 to provide a proper distribution of power. The relationship between the current and the voltage for the battery 14 is well modeled across its operating range. The relationship between the voltage and the current of the stack 12 is more difficult to define because it is non-linear, and changes depending on stack temperature, partial pressures and cathode and anode stoichiometries. Additionally the relationship between the stack current and voltage changes as the stack degrades over time. Particularly, an old and degraded stack will have lower cell voltages, and will need to provide more current to meet the power demands than a new, non-degraded stack.

When a vehicle operator makes a torque or power request to the fuel cell system 10, the power controller 20 converts the power request to a current demand for the fuel cell stack 12. FIG. 2 is a graph with stack current on the horizontal axis and stack voltage on the vertical axis showing a polarization curve 36 for a new fuel cell stack and a polarization curve 38 for an old fuel cell. If the vehicle operator requests 48 kW of power from the fuel cell system 10, the power controller 20 will determine how much current the stack 12 needs to provide based on the voltage that the stack is currently able to produce for that power request, and set the compressor speed and the hydrogen flow accordingly for that current. In this example, the new stack produces about 320 volts, which requires a stack current of about 150 amps. However, for the old stack, which is only able to generate about 290 volts, the compressor speed and the hydrogen flow would need to be set for about 163 amps of stack current to meet the 48 kW of requested power.

In some fuel cell system designs, a voltage source and an internal resistance of the source are used to model the dependency between stack voltage and current. The resistance value and the idle voltage of the voltage source need to be continuously changed in order to adapt to the actual voltage/current relationship of the stack as it ages. Therefore, two parameters have to be adapted based on only one actual pair of current and voltage, which leads to an infinite number of solutions. To address this problem, the known power algorithms slow down the adaptation of the parameters, which leads to using the actual current/voltage pair as well as pairs of recent time steps.

SUMMARY OF THE INVENTION

In accordance with the teachings of the present invention, a method for revising the current/voltage relationship of a fuel cell stack over time is disclosed. The method includes defining a reference polarization curve of the stack when it is new that identifies the relationship between the voltage and the current of the stack. As the stack ages, the polarization curve is revised based on the changing relationship between the stack voltage and current. When the stack is operating at low load and current density where kinetic voltage losses of the stack dominate, a first adaptation value is revised as the difference between the actual stack voltage and the stack voltage of the reference polarization curve. When the stack is operating at higher loads and current densities where ohmic voltage losses of the stack dominate, a second adaptation value is revised as the difference between the actual stack voltage and the stack voltage of the reference polarization curve.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for determining the current/voltage relationship of a fuel cell stack by revising a reference polarization curve as the stack ages is merely exemplary in nature, and is in no way intended to limit the invention or its applications or uses. For example, the power management algorithm of the invention discussed below has particular application for fuel cell system including a fuel cell stack and a rechargeable energy storage system. However, the power management algorithm can also be used to revise a stack polarization curve for a stack in a system that does not include a battery.

Figure 1:
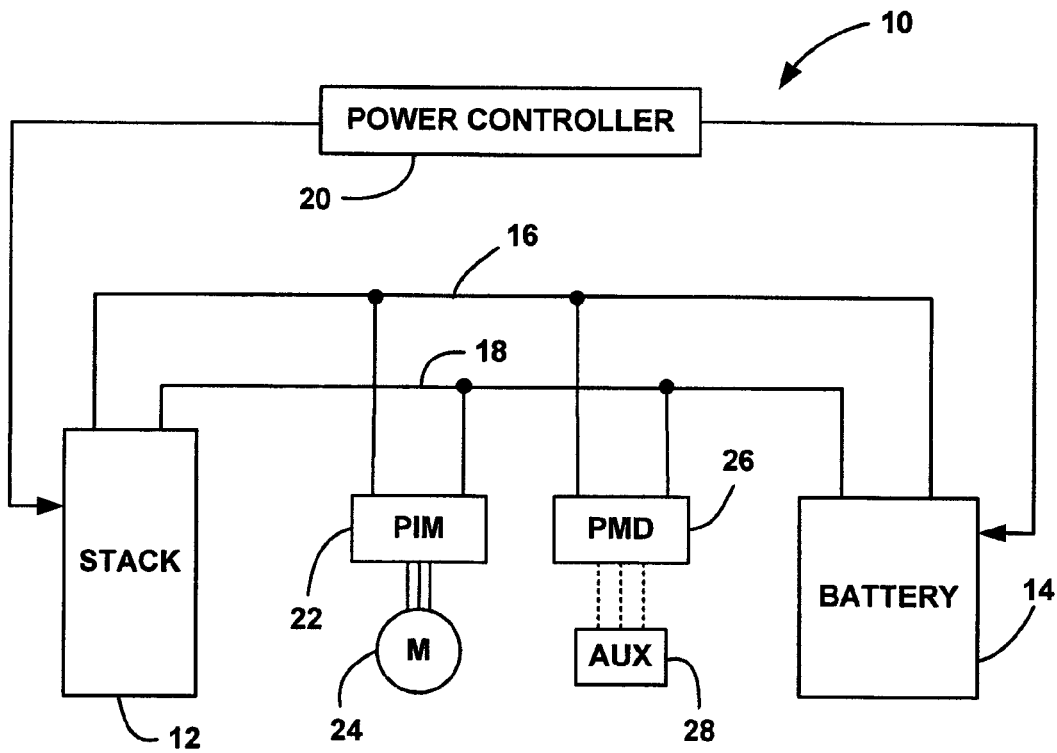
FIG. 1 is a block diagram of a fuel cell system including a fuel cell stack and a battery.
Figure 2:
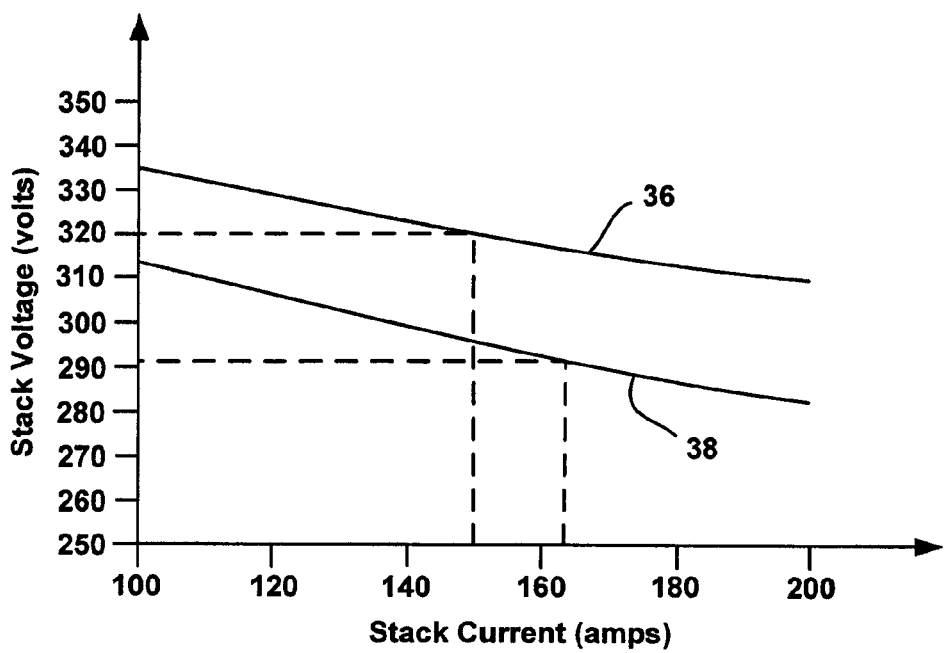
FIG. 2 is a graph with stack current on the horizontal axis and stack voltage on the vertical axis showing polarization curves for a new fuel cell stack and an old fuel cell stack.
Figure 3:
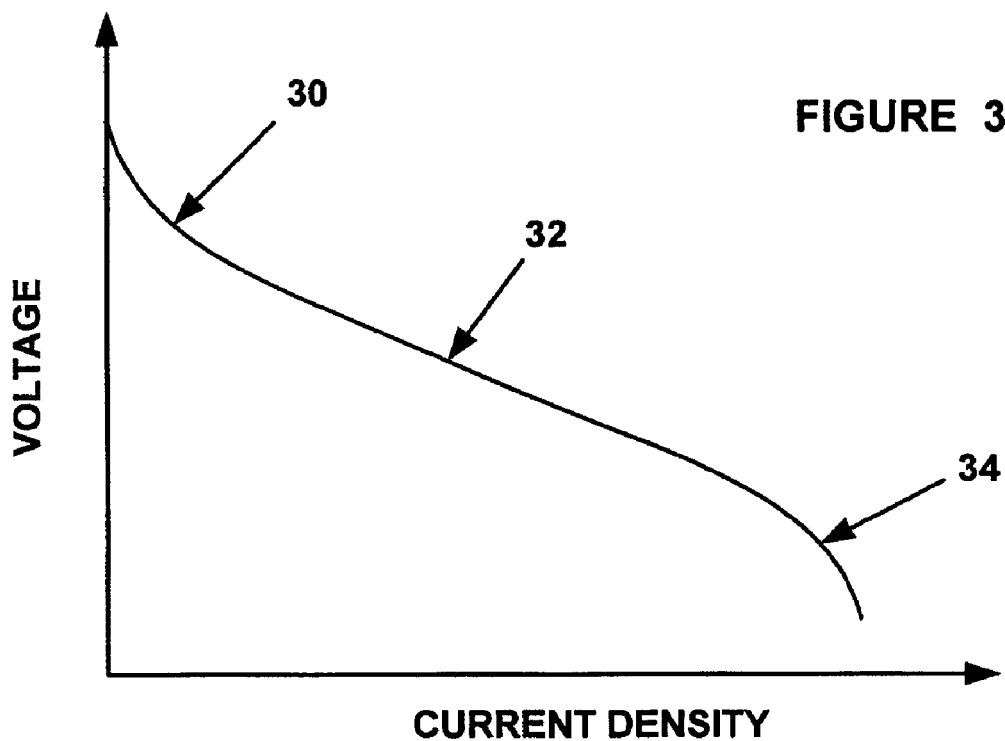
FIG. 3 is a graph with current density on the horizontal axis and average cell voltage on the vertical axis showing a polarization curve for a fuel cell stack.

The qualitative behavior of the voltage/current relationship of a fuel cell stack is well known from electrochemistry. FIG. 3 is a graph with cell current density on the horizontal axis and average cell voltage on the vertical axis showing a typical polarization curve or voltage/current relationship for a fuel cell stack. There are three impact factors that determine the voltage/current relationship of a fuel cell stack. At low stack loads and current densities, the stack voltage is high, and a kinetic or activation polarization loss is dominant at region 30 because electronic barriers have to be overcome prior to current and ion flow. Activation losses show some increase as current increases. At mid-range stack voltages and current densities, the polarization curve is linear and ohmic polarization losses at region 32 vary directly with current. The ohmic polarization losses increase over the whole range of stack current density because cell resistance remains essentially constant. At high stack loads, the stack voltage is low and the current density is high. At this location (region 34) of the polarization curve, mass transport losses are dominant. Mass transport losses occur over the entire range of current density, but these losses become prominent at high limiting currents where it becomes difficult to provide enough reactant flow to the cell reaction sites.

Normally, fuel cell stacks operate below the current density that would result in severe mass transport losses. Nevertheless, it is possible that due to degradation, an increase of the mass transport loss will take place, which means that the voltage loss will be higher with increasing current density.

Over time, the ohmic resistance will stay more or less constant if, for example, no severe corrosion of the bipolar plates occurs. However, the kinetic losses will increase so that the polarization curve will move to lower voltages over time. The shape of the curve will not change significantly when the mass transport related portion of the total voltage loss is negligible.

Besides these degradation effects, there are several operating conditions that influence the stack voltage. Increasing temperature, cathode stoichiometry and pressure would improve the voltage, where the polarization curve shifts toward higher voltages. Humidification of the reactant gases should be controlled in a way that guarantees a sufficient humidification of the membranes so as to reduce the ohmic resistance, and prevent water condensation within the stack 12, which prevents liquid water from entering the reactant gas channels in the stack 12. Otherwise, the ohmic resistance will increase, and hence the slope of the polarization curve will increase. If water condenses within the flow channels, the mass transport loss could increase severely so that the cell voltage could drop dramatically.

The present invention proposes an algorithm that determines the actual quantative behavior of the voltage/current relationship of the stack 12 using a reference polarization curve that gives the voltage/current characteristics and as few and as simple as possible adaptation parameters to meet the actual polarization curve of the fuel cell stack 12. Particularly, the present invention proposes an algorithm that models changes in the voltage/current relationship of the stack 12 as the stack 12 ages by considering the fact that the shape of the polarization curve remains substantially the same to the reference polarization curve when the stack 12 is new.

According to the invention, two adaptation values are defined. A first offset adaptation value C1 covers changes in the open circuit voltage for kinetic voltage losses (static voltage losses), and a second adaptation value C2 covers voltage losses at high stack loads for ohmic/mass transport losses (linear voltage losses). The algorithm is calibrated with a reference polarization curve defined by a reference voltage model $U_{Reference}$ when the fuel cell stack 12 is new, and the reference polarization curve voltage model $U_{Reference}$ is modified to be a polarization curve voltage model $U_{model}$ by the adaptation values C1 and C2 as the stack 12 ages.

$$U_{model}(I) = U_{Reference}(I) + C1 + C2 * I \quad (1)$$

The present invention uses conservative parameters for the power management control at system start-up. When the fuel cell stack 12 operates at low loads, where the stack current is less than a predetermined threshold, i.e., $I_{act} < I_{threshold}$, the power controller 20 would adjust the parameter C1 so that the actual stack power $U_{act}$ and the voltage model $U_{model}$ are the same. Particularly, the power controller 20 measures the voltage of each fuel cell in the stack 12, calculates the average cell voltage for all of the cells, and compares the average cell voltage to the average voltage for the reference polarization curve at that particular stack current density. The algorithm then changes the parameter C1 so that enough voltage is added to the calculated average cell voltage to be equal to the average cell voltage for the reference polarization curve. In one non-limiting embodiment, the current threshold $I_{threshold}$ is about 0.2 A/cm².

When the stack 12 operates at medium and high loads, where the stack current is greater than the threshold, i.e., $I_{act} > I_{threshold}$, the power controller 20 would adjust the parameter C2 so that the actual stack power $U_{act}$ and the voltage model $U_{model}$ are the same. The power controller 20 changes the parameter C2 to make the calculated average cell voltage equal to the average cell voltage of the reference polarization curve for that current density, as discussed above. This ensures a good prediction of the actual voltage at other currents than the actual current. The algorithm can adjust the voltage model $U_{model}$ each time the stack current density is in the kinetic or ohmic region of the polarization curve, or can periodically provide the calculation based on some applicable time frame.

At low stack loads, ohmic voltage losses will be negligible and at higher stack loads, kinetic voltage losses will be negligible. By measuring the cell voltages at different stack loads, calculating the average cell voltage, and then comparing the average cell voltage to the expected or reference average cell voltage, the adaptation values C1 and C2 can be determined. Thus, the power management model can be revised so that the model and the actual polarization curve will match as the stack 12 ages. In one embodiment, the reference polarization curve is stored as a series of values in a look-up table where interpolation is used to proved the curve between the values. As the stack ages, the values C1 and C2 are revised in the manner as discussed above so that a polarization curve representing the actual current/voltage relationship of the stack 12 can be derived as discussed above.

Figure 4:
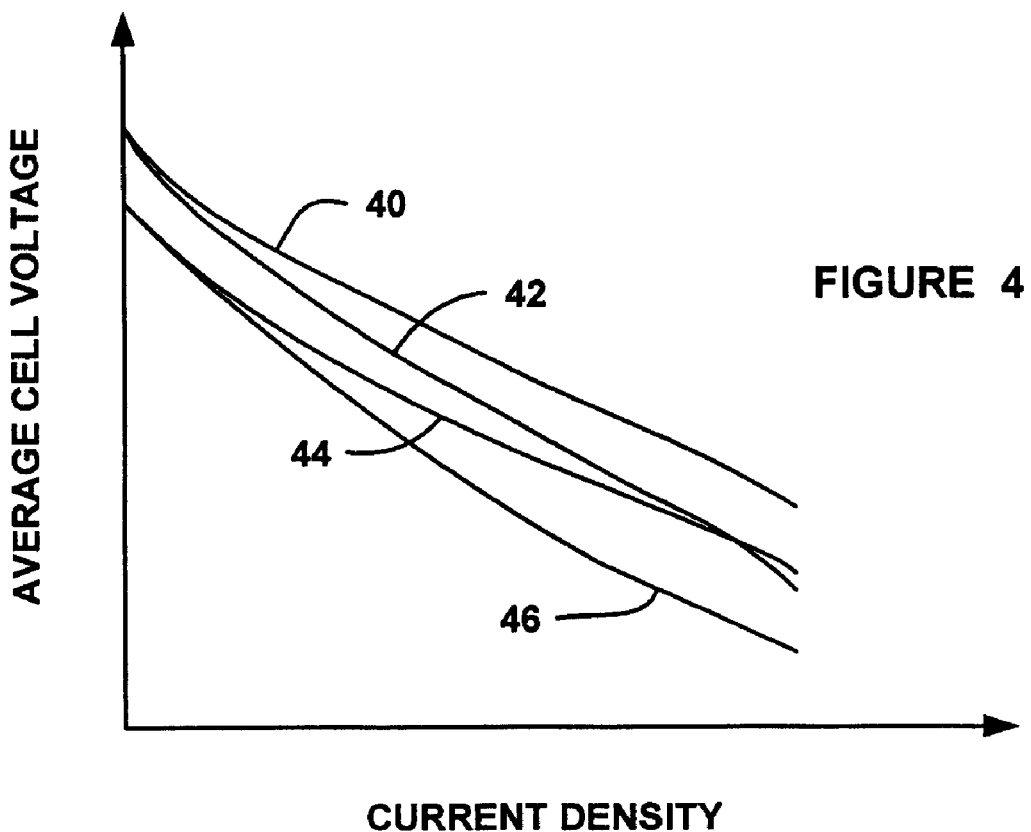
FIG. 4 is a graph with current density on the horizontal axis and average cell voltage on the vertical axis showing a reference polarization curve and polarization curves including linear and static voltage losses for a fuel cell stack.

FIG. 4 provides an illustrative example of modifying the reference polarization curve in response to linear and static voltage losses as the fuel cell stack 12 ages, according to the invention. Graph line 40 represents the reference polarization curve for a new fuel cell stack. Graph line 42 represents a stack polarization curve where only ohmic voltage losses (linear losses) have occurred, particularly 40 mVcm²/A as a result of stack aging. As discussed above, the adaptation value C2 is used to modify the reference polarization curve for linear losses, and thus, will subtract 40 mVcm²/A to the reference voltage model $U_{Reference}$. Graph line 44 represents a stack polarization curve where only kinetic voltage losses (static losses) have occurred, particularly 40 mV, as a result of stack aging. As discussed above, the adaptation value C1 is used to modify the reference polarization curve for static losses, and thus, will subtract 40 mV to the reference voltage model $U_{Reference}$. Graph line 46 represents a stack polarization curve where both ohmic and kinetic voltage losses have occurred, particularly 40 mVcm²/A+40 mV, as a result of stack aging.

The control algorithm for the fuel cell stack 12 would attempt to prevent operation in the mass transport region of the polarization curve. However, if the stack 12 did operate in the mass transport region for whatever reason, the algorithm of the invention would prevent adaptation of the stack polarization curve.

Alternatively, the look-up table for the reference polarization curve could be replaced with an arithmetic expression of the current/voltage relationship based on an empirical model such as:

$$V_e(T, p, p_{O_2}, \varphi) = \\ V_0(T, p, p_{O_2}, \varphi)_e - b(T, p, p_{O_2}, \varphi)\log(i_e) - R(T, p, p_{O_2}, \varphi)i_e - \\ m(t, p, p_{O_2}, \varphi) \times \exp[n(T, p, p_{O_2}, \varphi)i_e] - b(T, p, p_{O_2}, \varphi)\log\left(\frac{p}{p_{O_2}}\right) \quad (2)$$

Where $V_e$ is the voltage at current $i_e$, $V_0$ is the open circuit voltage, T is the absolute temperature, p is the total pressure, $p_{O_2}$ is the partial pressure of oxygen, $\varphi$ is humidity, and b, R, m and n are empirical equation constants. The adaptation values C1 and C2 would be revised in the same manner.

Taking the special characteristic of the fuel cell stack 12 into account, the reference polarization curve makes the adaptation of the model to the actual behavior of the system easier and more stable because the parameters can be adapted independent of each other. This enables an advanced, i.e., more stable and precise, power management, especially for vehicles with a boostless HV architecture. Further, the method of the invention for revising the stack polarization curve over time can be used in any fuel cell system that requires such changes of the stack polarization curve. For fuel cell hybrid vehicles, the fuel cell system may include a fuel cell stack and rechargeable energy storage system (RESS) directly coupled to a high voltage bus line, a fuel cell system including a DC/DC converter coupling the battery to the high voltage bus line, or a fuel cell system that uses ultra-capacitors and other devices to couple the RESS to the high voltage bus line.

The discussion above refers to the reference polarization curve as being the polarization curve for the fuel cell stack when it is new. In an alternate embodiment, a reference polarization curve can be for a first stack in a series of stacks, and the algorithm described above can be used to address the aging and operating conditions of the stacks and also production tolerances of one stack to the next stack in the series. For example, during the manufacturer of fuel cell stacks, a reference polarization curve can be identified for a first fuel cell stack in a series of fuel cell stacks being produced, and that reference polarization curve can be adapted to the other fuel cell stacks without having to do end of line testing to define the polarization curve for each fuel cell stack.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
   a fuel cell stack providing output power at a particular current density; and
   a power controller for controlling the output power of the fuel cell stack, said power controller storing a reference polarization curve that defines the current/voltage relationship of the fuel cell stack, said power controller revising the reference polarization curve to match an actual polarization curve of the stack over time when the stack current density is below a predetermined threshold by changing a first adaptation value and revising the reference polarization curve to match the actual polarization curve of the stack when the stack current density is above a predetermined threshold by changing a second adaptation value;
   wherein the first adaptation value defines an absolute voltage difference between the predicted average cell voltage of fuel cells in the stack and the average cell voltage of the reference polarization curve for a particular stack current density, and the second adaptation value defines a current dependent voltage difference between the predicted average cell voltage of fuel cells in the stack and the average cell voltage of the reference polarization curve for a articular stack current density.

2. The system according to claim 1 wherein the predetermined threshold defines a transition between where kinetic voltage losses are dominant and where ohmic voltage losses are dominant, where the kinetic voltage losses are dominant below the threshold and the ohmic voltage losses are dominant above the threshold.

3. The system according to claim 2 wherein the predetermined threshold is about 0.2 A/cm$^2$.

4. The system according to claim 1 wherein the reference polarization curve is the current/voltage relationship of a new fuel cell stack.

5. The system according to claim 1 further comprising a rechargeable energy storage device to supplement the fuel cell stack power.

6. The system according to claim 1 wherein the controller prevents the reference polarization curve from being revised when the stack is operating in a region of the reference polarization curve where mass transport voltage losses are dominant.

7. The system according to claim 1 wherein the reference polarization curve is stored as a plurality of values in a look-up table.

8. The system according to claim 1 wherein the reference polarization curve is stored as an arithmetric expression.

9. The system according to claim 1 wherein revising the reference polarization curve includes using the equation:

$$U_{model}(I) = U_{Reference}(I) + C1 + C2 * I$$

where $U_{model}$ is the revised reference polarization curve, $U_{Reference}$ is the reference polarization curve, C1 is the first adaptation value, C2 is the second adaptation value and I is current.

10. The system according to claim 1 wherein the reference polarization curve and the revised reference polarization curve are defined by the arithmetric expression:

$$V_e(T,p,p_{O_2},\phi) = V_0(T,p,p_{O_2},\phi)_e - b(T,p,p_{O_2},\phi)\log(i_e) - R(T,p,p_{O_2},\phi)i_e - m(i,p,p_{O_2},\phi) \times \exp[n(T,p,p_{O_2},\phi)i_e] - b(T,p,p_{O_2},\phi)\log(p/p_{O_2})$$

where $V_e$ is the voltage at current $i_e$, $V_0$ is the open circuit voltage, T is the absolute temperature, p is the total pressure, $p_{O_2}$ is the partial pressure of oxygen, $\phi$ is humidity, and b, R, m and n are empirical equation constants.

11. The system according to claim 1 wherein defining a reference polarization curve at a first point in time includes defining a reference polarization curve for a first fuel cell stack of a series of fuel cell stacks being manufactured, where the reference polarization curve is used for all of the stacks in the series.

12. A fuel cell system comprising:
   a fuel cell stack providing output power at a particular current density; and
   a power controller for controlling the output power of the fuel cell stack, said power controller storing a reference polarization curve that defines the current/voltage relationship of a new fuel cell stack, said power controller revising the reference polarization curve to match an actual polarization curve of the stack over time when the stack current density is either below or above a predetermined threshold and wherein the predetermined threshold defines a transition between where kinetic voltage losses are dominant and where ohmic voltage losses are dominant, where the kinetic voltage losses are dominant below the threshold and the ohmic voltage losses are dominant above the threshold.

13. The system according to claim 12 wherein the power controller revises the reference polarization curve when the stack is experiencing only static voltage losses or when the stack is experiencing additional linear voltage losses.

14. A fuel cell system comprising:
a fuel cell stack providing output power at a particular current density; and
a power controller for controlling the output power of the fuel cell stack, said power controller storing a reference polarization curve that defines the current/voltage relationship of the fuel cell stack, said power controller revising the reference polarization curve to match an actual polarization curve of the stack over time when the stack current density is below a predetermined threshold by changing a first adaptation value and revising the reference polarization curve to match the actual polarization curve of the stack when the stack current density is above a predetermined threshold by changing a second adaptation value;
wherein the predetermined threshold defines a transition between where kinetic voltage losses are dominant and where ohmic voltage losses are dominant, where the kinetic voltage losses are dominant below the threshold and the ohmic voltage losses are dominant above the threshold.

15. The system according to claim 14 wherein the predetermined threshold is about 0.2 A/cm$^2$.

16. The system according to claim 14 wherein the reference polarization curve is the current/voltage relationship of a new fuel cell stack.

17. The system according to claim 14 further comprising a rechargeable energy storage device to supplement the fuel cell stack power.

18. The system according to claim 14 wherein the controller prevents the reference polarization curve from being revised when the stack is operating in a region of the reference polarization curve where mass transport voltage losses are dominant.

19. The system according to claim 14 wherein the reference polarization curve is stored as a plurality of values in a look-up table.

20. The system according to claim 14 wherein the reference polarization curve is stored as an arithmetric expression.

21. The system according to claim 14 wherein revising the reference polarization curve includes using the equation:

$$U_{model}(I) = U_{Reference}(I) + C1 + C2 * I$$

where $U_{model}$ is the revised reference polarization curve, $U_{Reference}$ is the reference polarization curve, C1 is the first adaptation value, C2 is the second adaptation value and I is current.

22. The system according to claim 14 wherein the reference polarization curve and the revised reference polarization curve are defined by the arithmetric expression:

$$V_e(T,p,p_{O_2},\phi) = V_0(T,p,p_{O_2},\phi)_e - b(T,p,p_{O_2},\phi)\log(i_e) - R(T,p,p_{O_2},\phi)i_e - m(i,p,p_{O_2},\phi) \times \exp[n(T,p,p_{O_2},\phi)i_e] - b(T,p,p_{O_2},\phi)\log(p/p_{O_2})$$

where $V_e$ is the voltage at current $i_e$, $V_0$ is the open circuit voltage, T is the absolute temperature, p is the total pressure, $p_{O_2}$ is the partial pressure of oxygen, $\phi$ is humidity, and b, R, m and n are empirical equation constants.

23. The system according to claim 14 wherein defining a reference polarization curve at a first point in time includes defining a reference polarization curve for a first fuel cell stack of a series of fuel cell stacks being manufactured, where the reference polarization curve is used for all of the stacks in the series.

* * * * *